United States Patent
Tomizawa et al.

(10) Patent No.: US 10,330,472 B2
(45) Date of Patent: Jun. 25, 2019

(54) ANGULAR VELOCITY ACQUISITION DEVICE

(71) Applicant: KABUSHIKI KAISHA TOSHIBA, Tokyo (JP)

(72) Inventors: Yasushi Tomizawa, Fuchu Tokyo (JP); Haruka Yamamoto, Yokohama Kanagawa (JP); Tamio Ikehashi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

(21) Appl. No.: 15/444,272

(22) Filed: Feb. 27, 2017

(65) Prior Publication Data
US 2018/0003502 A1 Jan. 4, 2018

(30) Foreign Application Priority Data
Jun. 30, 2016 (JP) .................. 2016-130106

(51) Int. Cl.
*G01C 19/56* (2012.01)
*G01C 19/5712* (2012.01)
(Continued)

(52) U.S. Cl.
CPC ......... *G01C 19/5712* (2013.01); *G01C 19/56* (2013.01); *G01C 19/5719* (2013.01);
(Continued)

(58) Field of Classification Search
CPC ................................................................
G01C 19/56; G01C 19/5712; G01C 19/5719; G01C 19/5755; G01C 19/5762; G01P 15/125
See application file for complete search history.

(56) References Cited

U.S. PATENT DOCUMENTS

| 5,747,690 | A |   | 5/1998 | Park et al. |
| 5,908,986 | A | * | 6/1999 | Mitamura .......... G01C 19/5719 |
|   |   |   |   | 73/504.12 |

(Continued)

FOREIGN PATENT DOCUMENTS

| JP | 2014178317 A | 9/2014 |
| TW | I481818 B | 4/2015 |

OTHER PUBLICATIONS

Taiwan Office Action dated Dec. 1, 2017, filed in Taiwan counterpart Application No. 106102986, 9 pages (with translation).
(Continued)

*Primary Examiner* — Son T Le
*Assistant Examiner* — Herbert K Roberts
(74) *Attorney, Agent, or Firm* — Kim & Stewart LLP

(57) ABSTRACT

According to one embodiment, an angular velocity acquisition device includes a movable body that vibrates in a first direction and in a second direction that is based on Coriolis force and includes a movable electrode portion extending in the second direction, a hold electrode that extends in the second direction and includes a fixed electrode portion opposite to the movable electrode portion across a gap, and a stopper that is provided between the fixed electrode portion and the movable electrode portion and includes an end portion closer to the movable electrode portion than a surface of the fixed electrode portion facing the movable electrode portion.

14 Claims, 9 Drawing Sheets

(51) Int. Cl.
*G01C 19/5719* (2012.01)
*G01C 19/5755* (2012.01)
*G01C 19/5762* (2012.01)
*G01P 15/125* (2006.01)

(52) U.S. Cl.
CPC ..... *G01C 19/5755* (2013.01); *G01C 19/5762* (2013.01); *G01P 15/125* (2013.01)

(56) References Cited

U.S. PATENT DOCUMENTS

| | | | | |
|---|---|---|---|---|
| 6,360,605 | B1* | 3/2002 | Pinter | B81B 3/0008 |
| | | | | 73/514.32 |
| 6,694,814 | B2* | 2/2004 | Ishio | B81B 3/0008 |
| | | | | 361/283.3 |
| 6,923,062 | B2* | 8/2005 | Franz | B81B 3/0051 |
| | | | | 73/514.01 |
| 6,928,872 | B2 | 8/2005 | Durante et al. | |
| 8,850,887 | B2 | 10/2014 | Yanagisawa et al. | |
| 9,194,704 | B2 | 11/2015 | Lin et al. | |
| 2002/0134155 | A1* | 9/2002 | Ishitoko | G01C 19/5663 |
| | | | | 73/504.12 |
| 2003/0180504 | A1* | 9/2003 | Yoshida | G01C 19/5755 |
| | | | | 428/172 |
| 2004/0112133 | A1* | 6/2004 | Glenn | B81B 3/0051 |
| | | | | 73/504.12 |
| 2007/0131030 | A1* | 6/2007 | Jeong | G01C 19/5747 |
| | | | | 73/504.12 |
| 2008/0053224 | A1* | 3/2008 | Tsuji | G01C 19/5719 |
| | | | | 73/504.12 |
| 2009/0320592 | A1* | 12/2009 | Glenn | B81B 3/0051 |
| | | | | 73/504.12 |
| 2012/0024056 | A1* | 2/2012 | Hammer | G01C 19/5712 |
| | | | | 73/504.02 |
| 2013/0276536 | A1* | 10/2013 | Kanemoto | G01C 19/56 |
| | | | | 73/504.12 |
| 2014/0260613 | A1* | 9/2014 | Qiu | G01C 19/5733 |
| | | | | 73/504.15 |
| 2015/0177272 | A1* | 6/2015 | Clark | G01P 15/097 |
| | | | | 850/5 |
| 2016/0047837 | A1* | 2/2016 | Tanaka | G01P 15/125 |
| | | | | 73/514.32 |
| 2016/0298966 | A1* | 10/2016 | Ikehashi | G01C 19/5726 |
| 2017/0082519 | A1* | 3/2017 | Blomqvist | B81B 3/001 |

OTHER PUBLICATIONS

U.S. Appl. No. 15/243,511, filed Aug. 22, 2016.

* cited by examiner

ANGULAR VELOCITY ACQUISITION DEVICE

CROSS-REFERENCE TO RELATED APPLICATION

This application is based upon and claims the benefit of priority from Japanese Patent Application No. 2016-130106, filed Jun. 30, 2016, the entire contents of which are incorporated herein by reference.

FIELD

Embodiments described herein relate generally to an angular velocity acquisition device.

BACKGROUND

Known gyro sensors which detect the angular velocity using the Coriolis force that acts on an object that is vibrating in a rotation system include the one produced by using micro electro mechanical systems (MEMS) technology. The MEMS technology may involve variation in processing, which may impair a normal operation of the gyro sensor.

DETAILED DESCRIPTION

Figure 1:
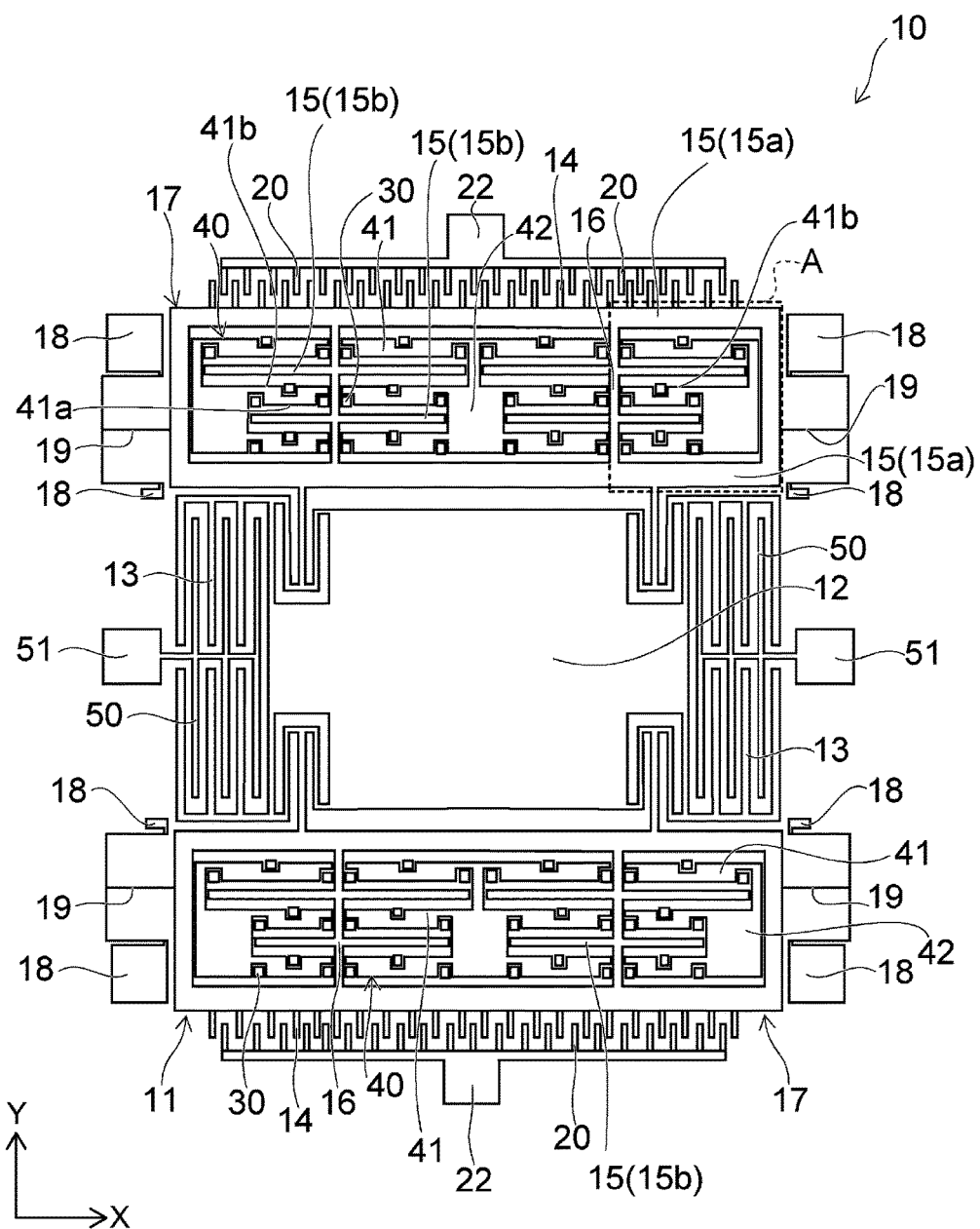
FIG. 1 is a schematic plan view of a MEMS portion of an angular velocity acquisition device according to an embodiment.

Embodiments provide an angular velocity acquisition device whose operation is hardly affected by any variation in processing thereof.

In general, according to one embodiment, an angular velocity acquisition device includes a movable body that vibrates in a first direction and in a second direction that is based on Coriolis force and includes a movable electrode portion extending in the second direction, a hold electrode that extends in the second direction and includes a fixed electrode portion opposite to the movable electrode portion across a gap, and a stopper that is provided between the fixed electrode portion and the movable electrode portion and includes an end portion closer to the movable electrode portion than a surface of the fixed electrode portion facing the movable electrode portion.

Hereinafter, example embodiments will be described with reference to the drawings. Furthermore, the same portions are assigned the respective same reference characters over all the figures.

FIG. 1 is a schematic plan view of a MEMS portion 10 of an angular velocity acquisition device according to an embodiment.

In FIG. 1, elements of the MEMS portion 10 illustrated therein are obtained by patterning a film provided on a substrate. The substrate is, for example, a silicon substrate, and the film, which configures the elements of the MEMS portion 10, is, for example, a silicon film.

The MEMS portion 10 includes a movable body 11, a drive electrode 20, a sense electrode 50, a hold electrode 40, and a stopper 30.

The movable body 11 is able to vibrate in the Y-direction and in the X-direction, the X-direction being perpendicular to the Y-direction. The movable body 11 includes a main mass portion 12, an electrode 17 for drive and hold, and an electrode 13 for sense. The main mass portion 12, the electrode 17, and the electrode 13 are provided integrally.

A pair of electrodes 17 for drive and hold is located away from each other in the Y-direction, and the main mass portion 12 is located between the pair of electrodes 17. Located at each side of the electrode 17 in the X-direction are an anchor portion 18 and a spring portion 19 the spring portion 19 connecting the anchor portion 18 and the electrode 17.

The electrode 17 includes a plurality of movable electrode portions 15 for hold extending in the X-direction and a plurality of movable electrode portions 14 for drive extending in the Y-direction. The plurality of movable electrode portions 15 for hold is arranged side by side in the Y-direction while being located away from each other. The plurality of movable electrode portions 14 for drive is arranged side by side in the X-direction while being located away from each other.

The electrode 17 further includes a supporting portion 16 extending in the Y-direction. The both ends of the supporting portion 16 in the Y-direction are respectively fixed to a pair of movable electrode portions 15a located outermost in the Y-direction of the plurality of movable electrode portions 15. One end of each of a plurality of movable electrode portions 15b located on the inner side of the outermost movable electrode portion 15a is fixed to the supporting portion 16, and each of the inner movable electrode portions 15b is cantilever-supported by the supporting portion 16.

A plurality of drive electrodes 20 each extending in the Y-direction is located near the movable electrode portions 14 for drive. The plurality of drive electrodes 20 is arranged side by side in the X-direction while being located away from each other. A portion of the drive electrode 20 extending in the Y-direction is located between the movable electrode portions 14 adjacent in the X-direction. The plurality of movable electrode portions 14 and the plurality of drive electrodes 20 are arranged in a comb-teeth pattern. The plurality of drive electrodes 20 is connected to a pad portion 22.

A drive voltage for forcibly vibrating the movable body 11 in the Y-direction is applied to the drive electrodes 20 via the pad portion 22. The drive voltage to be applied to the drive electrodes 20 is, for example, an alternating current (AC) voltage.

A plurality of electrodes 13 for sense extending in the Y-direction is located at each side of the main mass portion 12 in the X-direction. The plurality of electrodes 13 is arranged side by side in the X-direction while being located away from each other.

A plurality of sense electrodes 50 each extending in the Y-direction is located near the electrodes 13 for sense. Each sense electrode 50 is located between the electrodes 13 adjacent in the X-direction of the movable body 11. The electrodes 13 and the sense electrodes 50 are alternately arranged side by side in the X-direction. The electrode 13 and the sense electrode 50 face each other across a gap. The plurality of sense electrodes 50 is connected to a pad 51.

A hold electrode 40 is located inside the electrode 17 for drive and hold of the movable body 11. The hold electrode 40 includes a plurality of pad portions 42 and a plurality of fixed electrode portions 41 extending in the X-direction. The plurality of fixed electrode portions 41 is arranged side by side in the Y-direction while being located away from each other. The plurality of fixed electrode portions 41 is connected to the pad portions 42.

The movable electrode portions 15 extending in the X-direction and the fixed electrode portions 41 extending in the X-direction are alternately arranged side by side in the Y-direction. The movable electrode portion 15 and the fixed electrode portion 41 face each other across a gap.

One fixed electrode portion 41 extending in the X-direction includes a first facing surface 41a, which faces the movable electrode portion 15 at one side in the Y-direction (at the lower side in FIG. 1), and a second facing surface 41b, which faces the movable electrode portion 15 at the other side in the Y-direction (at the upper side in FIG. 1).

Located between the movable electrode portion 15 and the fixed electrode portion 41 is a plurality of stoppers 30. The plurality of stoppers 30 is arranged away from each other along the X-direction, in which the fixed electrode portion 41 extends.

Figure 2:
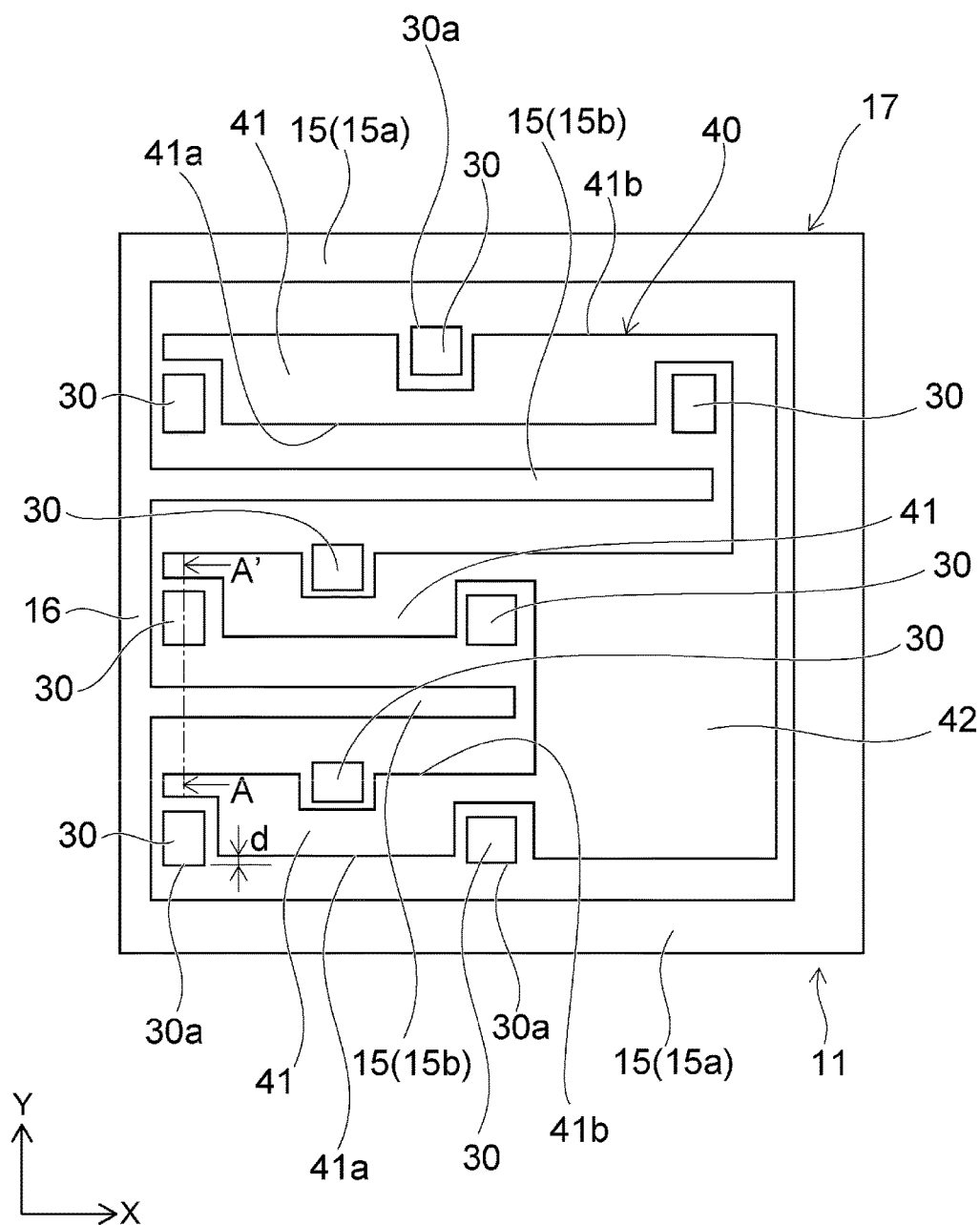
FIG. 2 is an enlarged schematic plan view of a portion A illustrated in FIG. 1.

FIG. 2 is an enlarged schematic plan view of a portion A illustrated in FIG. 1.

The fixed electrode portion 41 extending in the X-direction has one end (the right end in FIG. 2) that is connected to the pad portion 42. The fixed electrode portion 41 extends from the one end connected to the pad portion 42 toward the supporting portion 16 of the electrode 17 of the movable body 11. The other end (the left end in FIG. 2) of the fixed electrode portion 41 is located away from the supporting portion 16, and the fixed electrode portion 41 is cantilever-supported by the pad portion 42.

A pair of stoppers 30 is respectively arranged at both ends in the X-direction of the fixed electrode portion 41. Each of the stoppers 30 arranged at the both ends of the fixed electrode portion 41 has an end portion 30a, which faces the movable electrode portion 15 at the side of the first facing surface 41a of the fixed electrode portion 41.

The end portion 30a of the stopper 30, which faces the movable electrode portion 15 at the side of the first facing surface 41a, protrudes toward the movable electrode portion 15 and is located closer to the movable electrode portion 15 than the first facing surface 41a of the fixed electrode portion 41. The distance "d" between the first facing surface 41a of the fixed electrode portion 41 and the end portion 30a of the stopper 30 located at the side of the first facing surface 41a is, for example, in a range of from 0.3 μm to 0.5 μm.

A stopper 30 is also arranged at the side of the second facing surface 41b of the fixed electrode portion 41. The stopper 30 arranged at the side of the second facing surface 41b is located in the X-direction between the stoppers 30 arranged at the both ends of the fixed electrode portion 41.

The stopper 30 arranged at the side of the second facing surface 41b has an end portion 30a, which faces the movable electrode portion 15 at the side of the second facing surface 41b. The end portion 30a of the stopper 30, which faces the movable electrode portion 15 at the side of the second facing surface 41b, protrudes toward the movable electrode portion 15 and is located closer the movable electrode portion 15 than the second facing surface 41b of the fixed electrode portion 41.

Each stopper 30 is located in a recess-shaped region in a plan view illustrated in FIG. 2 that is formed in each of the first facing surface 41a and the second facing surface 41b of the fixed electrode portion 41. Between the stopper 30 and the fixed electrode portion 41, a gap is formed so that the stopper 30 and the fixed electrode portion 41 are not in contact with each other.

Figure 3:
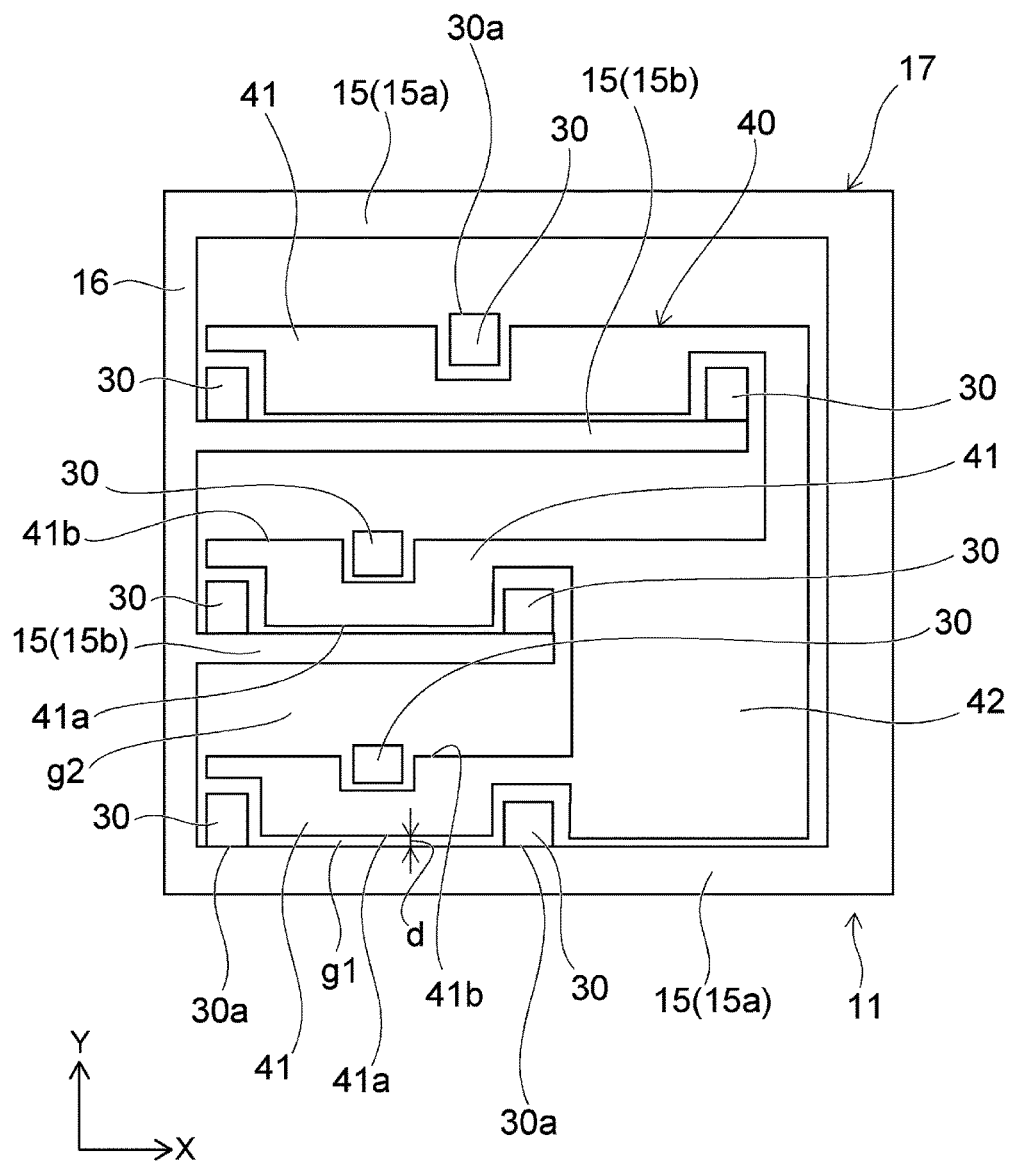
FIG. 3 is a schematic plan view illustrating a hold state of a movable body illustrated in FIG. 2.

The movable body 11 is able to vibrate in the Y-direction but the stopper 30 restricts the movement in the Y-direction of the movable body 11 at a predetermined position (hold position) illustrated in FIG. 3. When the movable electrode portion 15 of the movable body 11 contacts the stopper 30, the Y-directed movement of the movable body 11 in FIGS. 1 to 3 is restricted.

A hold voltage for holding the electrode 17 of the movable body 11 at the hold position illustrated in FIG. 3 is applied to the hold electrode 40, which includes the fixed electrode portion 41. The hold voltage is, for example, a direct current (DC) voltage.

As illustrated in FIG. 3, when the movable electrode portion 15 contacts the end portion 30a of the stopper 30 arranged at the side of the first facing surface 41a of the fixed electrode portion 41, the hold voltage is applied to the fixed electrode portion 41, so that an electrostatic attractive force is generated between the fixed electrode portion 41 and the movable electrode portion 15.

When the electrode 17 of the movable body 11 is at the hold position illustrated in FIG. 3, the movable electrode portion 15 contacts the stopper 30, so that a gap g1 exists between the first facing surface 41a of the fixed electrode portion 41 and the movable electrode portion 15. A gap g2 exists between the second facing surface 41b of the fixed electrode portion 41 and the movable electrode portion 15.

The distance between the first facing surface 41a of the fixed electrode portion 41 and the movable electrode portion 15 facing each other across the gap g1 is smaller than the distance between the second facing surface 41b of the fixed electrode portion 41 and the movable electrode portion 15 facing each other across the gap g2. Accordingly, the electrostatic attractive force acting between the first facing surface 41a of the fixed electrode portion 41 and the movable electrode portion 15 is larger than the electrostatic attractive force acting between the second facing surface 41b of the fixed electrode portion 41 and the movable electrode portion 15. Therefore, the hold state illustrated in FIG. 3, in which the movable electrode portion 15 is attracted to the side of the first facing surface 41a of the fixed electrode portion 41, is maintained.

The sense electrode 50 illustrated in FIG. 1 and the electrode 13 of the movable body 11 located opposite the sense electrode 50 form a variable capacitor. A change in capacitance of the variable capacitor is detectable at the pad portion 51. The change in capacitance permits detection of the angular velocity of the movable body 11.

When the movable body 11 is subjected to a rotational movement about an axis perpendicular to the X-direction and the Y-direction while vibrating in the Y-direction, the movable body 11 vibrates in the X-direction perpendicular to the Y-direction due to the Coriolis force. Generally, the angular velocity is proportional to the amplitude of vibration in the X-direction of the movable body 11.

Accordingly, the angular velocity of the rotational movement of the movable body 11 can be calculated from the amplitude of vibration in the X-direction of the movable body 11. According to the embodiment, when the movable body 11 vibrating in the Y-direction vibrates in the X-direction due to the Coriolis force, the distance between the sense electrode 50 and the electrode 13 of the movable body 11 varies, so that the capacitance of a variable capacitor with the sense electrode 50 and the electrode 13 serving as opposite electrodes changes. Detecting the change in capacitance enables obtaining the amplitude of vibration in the X-direction of the movable body 11 and thus calculating the angular velocity of the movable body 11.

Figure 4:
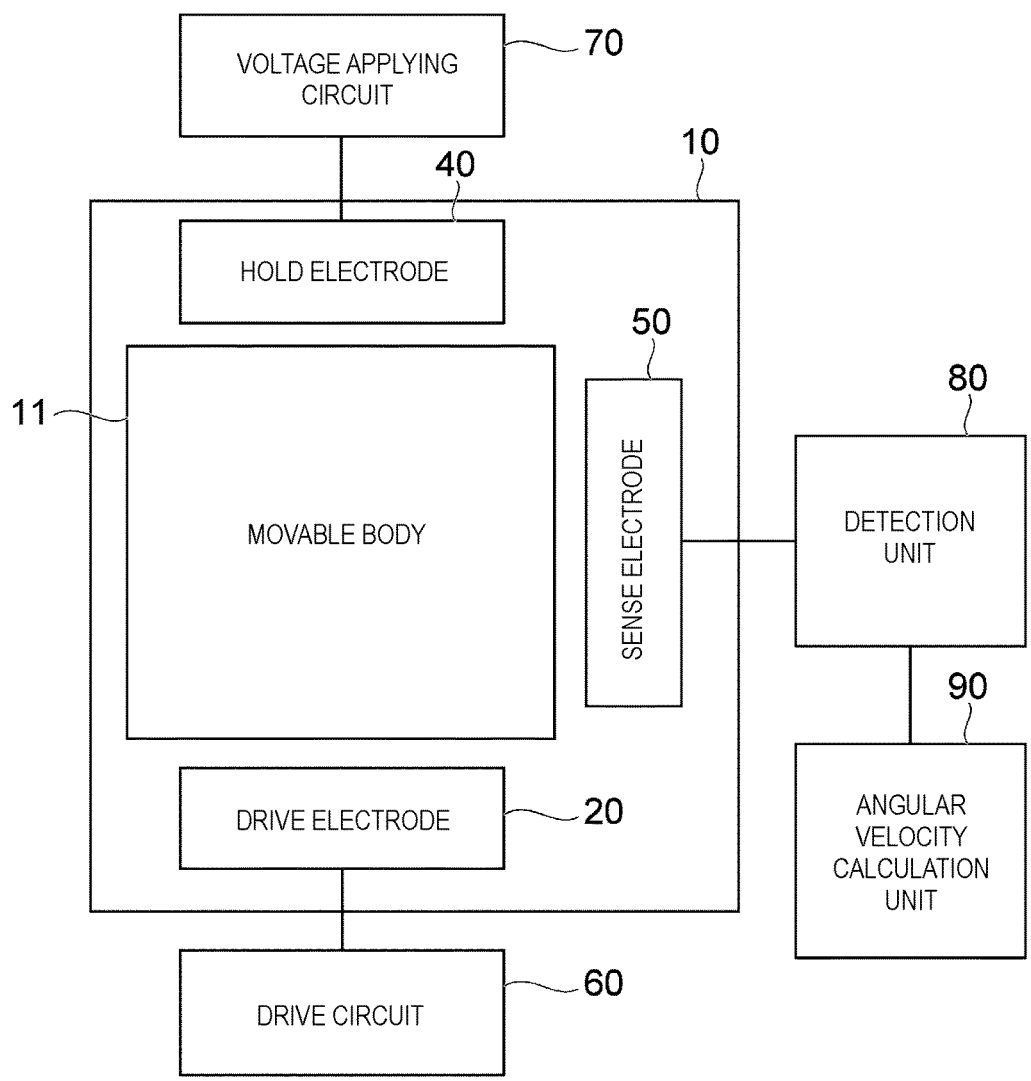
FIG. 4 is a block diagram illustrating a configuration of the angular velocity acquisition device according to the embodiment.

FIG. 4 is a block diagram illustrating a configuration of the angular velocity acquisition device according to the embodiment.

The angular velocity acquisition device according to the embodiment includes, in addition to the MEMS portion 10 illustrated in FIG. 1, a drive circuit 60, a voltage applying circuit 70, a detection unit 80, and an angular velocity calculation unit 90.

The MEMS portion 10, the drive circuit 60, the voltage applying circuit 70, the detection unit 80, and the angular velocity calculation unit 90 are formed into one chip on the same semiconductor substrate. Alternatively, the MEMS portion 10 and the circuit system elements are formed into respective separate chips, and these chips are mounted on an interposer (interconnection substrate) to configure a single package component.

In FIG. 4, the drive circuit 60 applies a drive voltage (AC voltage) to the drive electrode 20. The drive electrode 20 is electrically connected to the drive circuit 60 via the pad portion 22 illustrated in FIG. 1 and wirings (not illustrated) formed by bonding on the pad portion 22.

The voltage applying circuit 70 applies a hold voltage (DC voltage) to the hold electrode 40. The fixed electrode portion 41 of the hold electrode 40 is electrically connected to the voltage applying circuit 70 via the pad portion 42 illustrated in FIG. 1 and wirings (not illustrated) formed by bonding on the pad portion 42.

The detection unit 80 is electrically connected to the sense electrode 50 via the pad portion 51 illustrated in FIG. 1 and wirings (not illustrated) formed by bonding on the pad portion 51.

The detection unit 80 detects a predetermined physical amount that depends on the amplitude of vibration in the X-direction of the movable body 11 that is based on the Coriolis force acting on the movable body 11 vibrating in the Y-direction. The predetermined physical amount is, for example, a physical amount that is based on the capacitance between the electrode 13 of the movable body 11 and the sense electrode 50.

As previously mentioned, when the movable body 11 vibrates in the X-direction due to the Coriolis force, the capacitance of a variable capacitor configured with the sense electrode 50 and the electrode 13 of the movable body 11 changes. Detecting the change in capacitance enables obtaining the amplitude of vibration in the X-direction of the movable body 11. More specifically, the detection unit 80 detects a potential difference between the sense electrode 50 and the electrode 13 that is based on the capacitance of the variable capacitor. The amplitude of vibration in the X-direction of the movable body 11 can be substantially obtained based on the detected potential difference.

The angular velocity calculation unit 90 calculates the angular velocity of the movable body 11 based on the predetermined physical amount detected by the detection unit 80. As previously mentioned, since the angular velocity is proportional to the amplitude of vibration in the X-direction of the movable body 11 that is based on the Coriolis force, the angular velocity of the movable body 11 can be calculated based on a result of detection by the detection unit 80.

Figure 5:
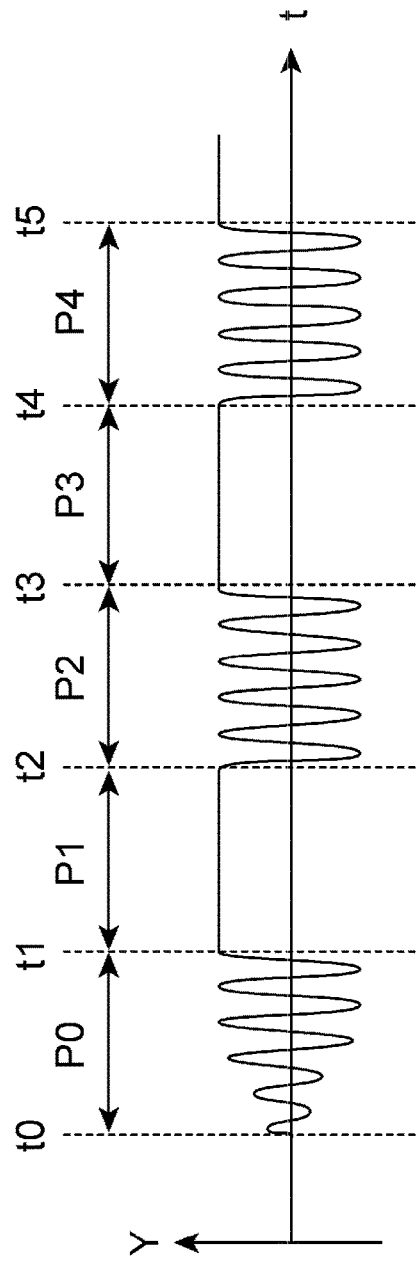
FIG. 5 is an operation timing chart of the angular velocity acquisition device according to the embodiment.

Next, referring to a timing chart illustrated in FIG. 5, an operation of the angular velocity acquisition device according to the embodiment is described. In FIG. 5, the ordinate axis indicates the amplitude in the Y-direction of the movable body 11, and the abscissa axis indicates the time axis.

When the angular velocity acquisition device according to the embodiment is activated, the movable body 11 starts an operation with the initial state. In the initial state, the movable body 11 is not held in the hold state illustrated in FIG. 3, but is at rest at the center position of free vibration in the Y-direction.

Then, when a drive voltage is applied from the drive circuit 60 to the drive electrode 20, the movable body 11 is forcibly vibrated in the Y-direction. In FIG. 5, a forced vibration of the movable body 11 is started at time t0. Usually, only at the time of the starting of the above-mentioned of the angular velocity acquisition device, the drive voltage is applied from the drive circuit 60 to the drive electrode 20.

After the amplitude of vibration in the Y-direction of the movable body 11 reaches a predetermined level, the forced vibration is stopped at time t1. For example, when the amplitude of vibration in the Y-direction of the movable body 11 reaches a peak, application of the drive voltage to the drive electrode 20 is stopped, and application of the hold voltage from the voltage applying circuit 70 to the hold electrode 40 is started.

An electrostatic attractive force is generated between the fixed electrode portion 41 of the hold electrode 40 and the movable electrode portion 15 of the movable body 11, so that the movable electrode portion 15 is attracted toward the first facing surface 41a of the fixed electrode portion 41. As illustrated in FIG. 3, the movable electrode portion 15 contacts the stopper 30 located at the side of the first facing surface 41a, so that the electrode 17 of the movable body 11 is held at the hold position illustrated in FIG. 3. A period from the above-mentioned time t0 to the time t1 is referred to as an "initial setting period P0".

When the initial setting period P0 ends, a sensing period is started. In the sensing period, the movable body 11 intermittently vibrates in the Y-direction. In the example illustrated in FIG. 5, in a period P1 from time t1 to time t2 and a period P3 from time t3 to time t4, the movable body 11 is held at the above-mentioned hold position and the vibration in the Y-direction of the movable body 11 is stopped. Each of the periods P1 and P3, in which the vibration in the Y-direction is stopped, is referred to as a "hold period".

In a period P2 from time t2 to time t3 and a period P4 from time t4 to time t5, the movable body 11 is vibrating in the Y-direction. Each of the periods P2 and P4, in which the movable body 11 is vibrating in the Y-direction, is referred to as a "vibration period". After time t5, similarly, the hold period and the vibration period are alternately repeated at a fixed rate.

To perform the change from the hold period to the vibration period, application of the hold voltage to the hold electrode 40 is stopped. The movable body 11 starts a free vibration in the Y-direction from the hold position. Thus, in the vibration period, the drive voltage is not supplied from the drive circuit 60 to the drive electrode 20, so that the movable body 11 freely vibrates in the Y-direction.

At the timing when a predetermined time elapses after the movable body 11 starts the free vibration in the Y-direction and when the vibration in the Y-direction of the movable body 11 reaches a peak, the hold voltage is applied from the voltage applying circuit 70 to the hold electrode 40. Similar to an operation at the end point (time t1) of the above-mentioned initial setting period P0, an electrostatic attractive force is generated between the fixed electrode portion 41 and the movable electrode portion 15 due to the hold voltage applied to the hold electrode 40, and the movable electrode portion 15 is attracted toward the fixed electrode portion 41, so that the movable body 11 is stopped by the stopper 30 at the hold position illustrated in FIG. 3.

When the movable body 11 is subjected to a rotational movement in the vibration period, in which the movable body 11 freely vibrates in the Y-direction, the movable body 11 vibrates in the X-direction due to the Coriolis force. As previously mentioned, when the movable body 11 vibrates in the X-direction due to the Coriolis force, the capacitance of a variable capacitor configured with the sense electrode 50 and the electrode 13 of the movable body 11 changes. Detecting the change in capacitance enables obtaining the amplitude of vibration in the X-direction of the movable body 11 and thus calculating the angular velocity of the movable body 11.

According to the embodiment, the movable body 11 can be held at a predetermined position by the stopper 30 and the hold electrode 40. Then, the movable body 11 is released from the held state and is allowed to freely vibrate, and, during a period in which the movable body 11 is freely vibrating, the angular velocity thereof is detected. Electric power consumed by the holding operation for the movable body 11 and the free vibration of the movable body 11 is very small compared with electric power consumed by the forced vibration of the movable body 11 performed by the drive electrode 20. According to the embodiment, an angular velocity acquisition device with low power consumption can be provided.

The stopper 30 prevents contact and short circuit between the fixed electrode portion 41 of the hold electrode 40 and the movable electrode portion 15 of the movable body 11. The potential of the stopper 30 is floating.

The stopper 30 is arranged at each of the both ends of the fixed electrode portion 41 extending in the X-direction. Therefore, in the hold state illustrated in FIG. 3, both end portions in the X-direction of the movable electrode portion 15b cantilever-supported by the supporting portion 16 of the movable body 11 contact the stoppers 30.

The movable electrode portion 15b as cantilever-supported may be deflected by an electrostatic attractive force acting between the movable electrode portion 15b and the fixed electrode portion 41 in such a way to bring the both ends thereof close to the fixed electrode portion 41. The stoppers 30 which are arranged at both ends in the X-direction of a region in which the fixed electrode portion 41 and the movable electrode portion 15b face each other reliably prevent the both ends of the deflected movable electrode portion 15b from contacting the fixed electrode portion 41.

The stopper 30 which is arranged at the side of the second facing surface 41b of the fixed electrode portion 41 prevents contact between the fixed electrode portion 41 and the movable electrode portion 15 when no electrostatic attractive force acts between them. For example, when a downward force is applied to the movable body 11 being in the initial position illustrated in FIGS. 1 and 2, the movable electrode portion 15 facing the second facing surface 41b contacts the stopper 30 arranged at the side of the second facing surface 41b, so that contact between the movable electrode portion 15 and the fixed electrode portion 41 is prevented.

Figure 6A:
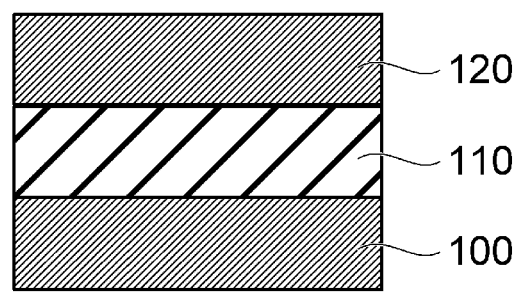
FIGS. 6A, 6B, and 6C are schematic cross-sectional views illustrating a method for manufacturing the angular velocity acquisition device according to the embodiment.
Figure 6B:
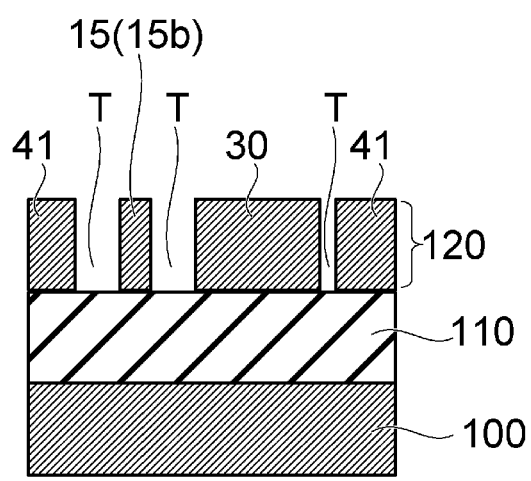
Figure 6C:
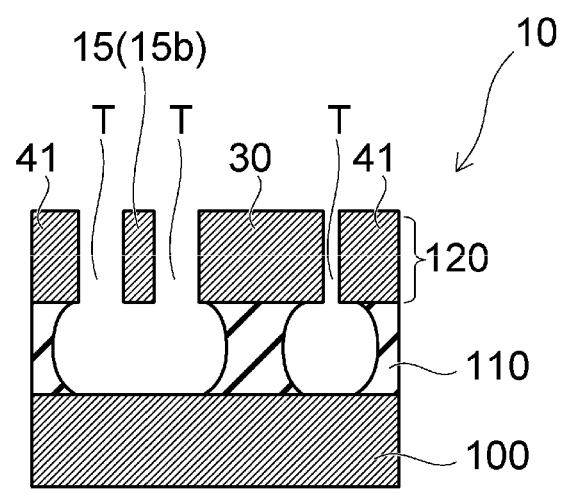

FIGS. 6A to 6C are schematic cross-sectional views illustrating a method for manufacturing the MEMS portion 10 according to the embodiment. The cross-section surfaces illustrated in FIGS. 6A to 6C correspond to the cross-section surface of a portion A-A' illustrated in FIG. 2.

As illustrated in FIG. 6A, an insulating film 110 is formed on a substrate 100, and a film 120, which is used to configure the MEMS portion 10, is formed on the insulating film 110. For example, the substrate 100 is a silicon substrate, the insulating film 110 is a silicon oxide film, and the film 120 is a silicon film.

The film 120 is patterned into the shape illustrated in FIG. 1. Etching is applied to the film 120, which is a silicon film, for example, according to a reactive ion etching (RIE) method with the use of a gas containing fluorine. As illustrated in FIG. 6B, trenches T leading to the insulating film 110 are formed in the film 120.

Etching is applied to the insulating film (silicon oxide film) 110 exposed to the trenches T, for example, with the use of hydrofluoric acid vapor. That etching progresses isotropically, so that, as illustrated in FIG. 6C, portions of the insulating film 110 under the movable electrode portion 15 of the movable body 11 are removed.

Portions of the insulating film 110 under the other portions of the movable body 11 are also removed. The movable body 11 and the spring portion 19 illustrating in FIG. 1 are brought into a state of floating above the substrate 100. The elements other than the movable body 11 and the spring portion 19 illustrating in FIG. 1 are supported on the substrate 100 via the insulating film 110. The movable body 11 is supported by the anchor portion 18 via the spring portion 19.

Etching is applied to the film 120 with the use of a mask formed on the film 120. The mask is patterned in the shape illustrated in FIG. 1.

Figure 7:
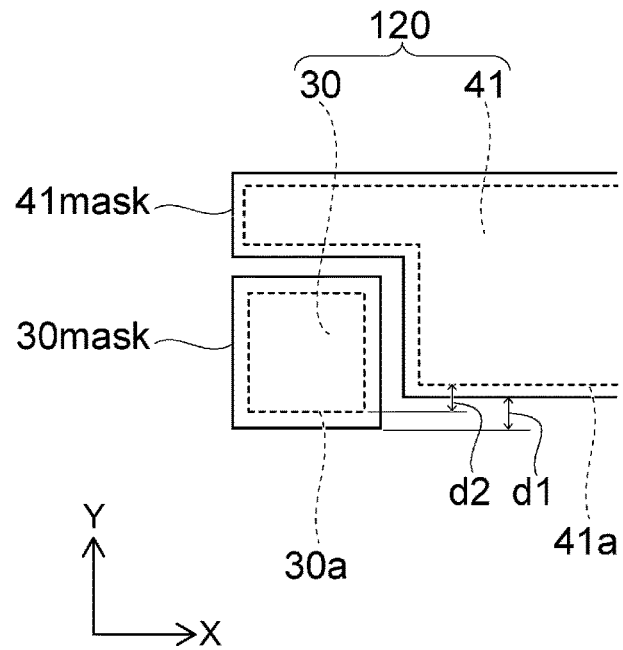
FIG. 7 is a schematic plan view illustrating the method for manufacturing the angular velocity acquisition device according to the embodiment.

FIG. 7 is a schematic plan view of portions 30 mask and 41 mask of the mask.

Etching is applied to the film 120 in the vertical direction (in the film thickness direction) according to the RIE method. At that time, side etching (over-etching in the horizontal direction) may also progress with respect to the film 120 and the planar size of the film 120 may become smaller than the planar size of the mask portion 30 mask or 41 mask as indicated by a dashed line in FIG. 7. The side surface exposed to the trench T of the film 120 recedes behind the edge of the mask portion 30 mask or 41 mask.

The rate of side etching on the film 120 tends to depend on the width or density of the trench T. In a case where the stopper 30 and the fixed electrode portion 41 are distantly positioned, if a large difference occurs in the rate of side etching between the stopper 30 and the fixed electrode portion 41 due to the density of a region in which those are positioned, an appropriate relationship between the distance between the movable electrode portion 15 and the end portion 30a of the stopper 30 and the distance between the movable electrode portion 15 and the first facing surface 41a of the fixed electrode portion 41 may be unable to be implemented. In other words, the movable electrode portion 15 may contact the fixed electrode portion 41 before contacting the stopper 30, so that the movable electrode portion 15 and the fixed electrode portion 41 may short-circuit.

According to the embodiment, the end portion 30a of the stopper 30, which is arranged to contact the movable electrode portion 15, is located on approximately the same side as the first facing surface 41a of the fixed electrode portion 41 and in proximity thereto. Therefore, at the time of RIE on the film 120, a difference between the amount by which the end portion 30a of the stopper 30 recedes behind the edge of the mask portion 30 mask and the amount by which the first facing surface 41a of the fixed electrode portion 41 recedes behind the edge of the mask portion 41 mask can be made small.

Accordingly, a difference between the distance d1 between the first facing surface and the stopper on the mask portions 30 mask and 41 mask and the distance d2 between the first facing surface 41a of the fixed electrode portion 41 and the end portion 30a of the stopper 30 which are formed by etching can be made small. Thus, the distance d2 can be obtained as approximately the same value as the design value. The attainment of the high-accuracy and stabilized distance d2 reliably prevents short circuit between the movable electrode portion 15 and the fixed electrode portion 41 in the hold position.

Furthermore, if the distance d1 (d2) is designed to be somewhat large in view of the variation in processing such as that mentioned above, the distance "d" between the fixed electrode portion 41 and the movable electrode portion 15 in the hold state illustrated in FIG. 3 becomes large. This may lead to a rise in the hold voltage for maintaining the hold state and an increase in power consumption.

According to the embodiment, since the distance "d" can be formed with high precision in spite of variation in processing, the distance "d" can be made smaller. This leads to a reduction in power consumption.

Figure 8:
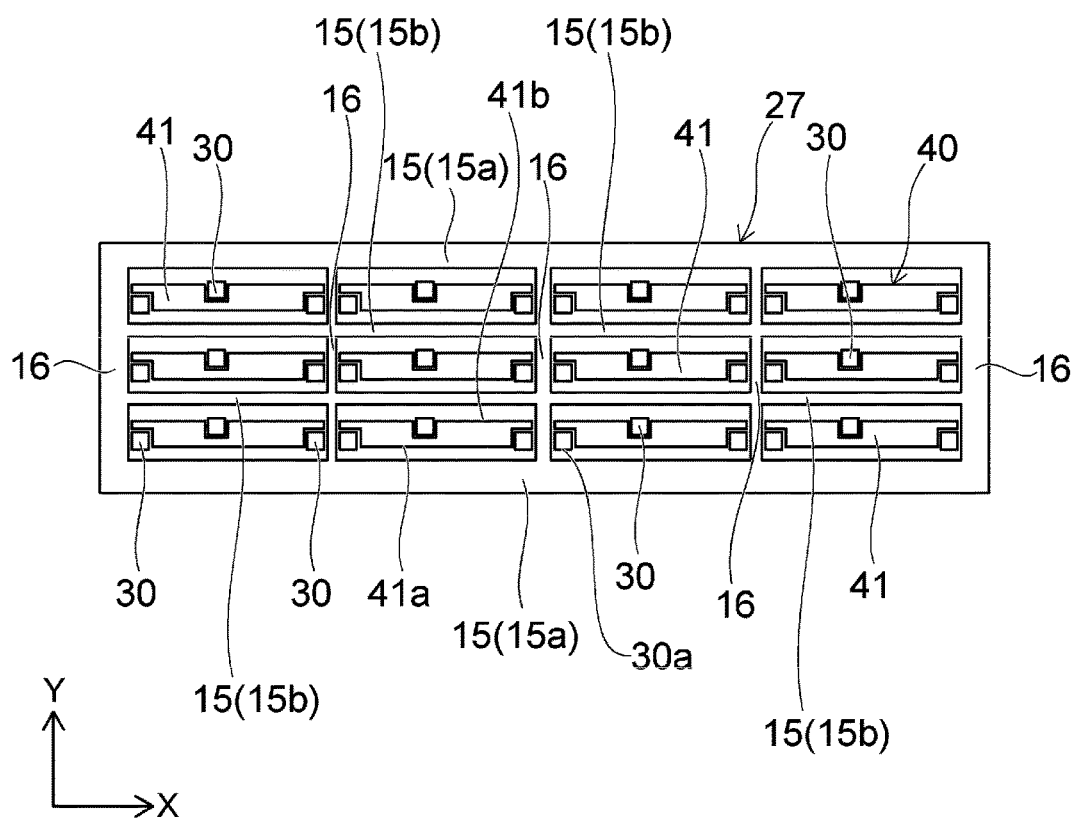
FIG. 8 is a schematic plan view illustrating another example of a movable electrode portion and a hold electrode of the angular velocity acquisition device according to the embodiment.

FIG. 8 is a schematic plan view illustrating another example of the movable electrode portion 15 and the hold electrode 40.

In this embodiment, the movable body 11 includes an electrode 27 illustrated in FIG. 8 instead of the electrode 17 illustrated in FIG. 1.

The electrode 27 includes a plurality of movable electrode portions 15 extending in the X-direction and a plurality of supporting portions 16 extending in the Y-direction. The both ends in the X-direction of the movable electrode portion 15 are affixed to the supporting portions 16, so that the movable electrode portion 15 is supported at both ends. The support at both ends of the movable electrode portion 15 increases the mechanical strength of the movable electrode portion 15 as compared with the cantilever support.

As in the above-described embodiment, the hold electrode 40 is located inside the electrode 27. The hold electrode 40 includes a plurality of fixed electrode portions 41 extending in the X-direction. The fixed electrode portion 41 and the movable electrode portion 15 are alternately arranged side by side in the Y-direction.

The electrode 27 has a plurality of regions partitioned in a lattice shape, and one fixed electrode portion 41 is located in each region. Both ends in the X-direction of one fixed electrode portion 41 located in each region are located away from the supporting portions 16 of the electrode 27.

Figure 9:
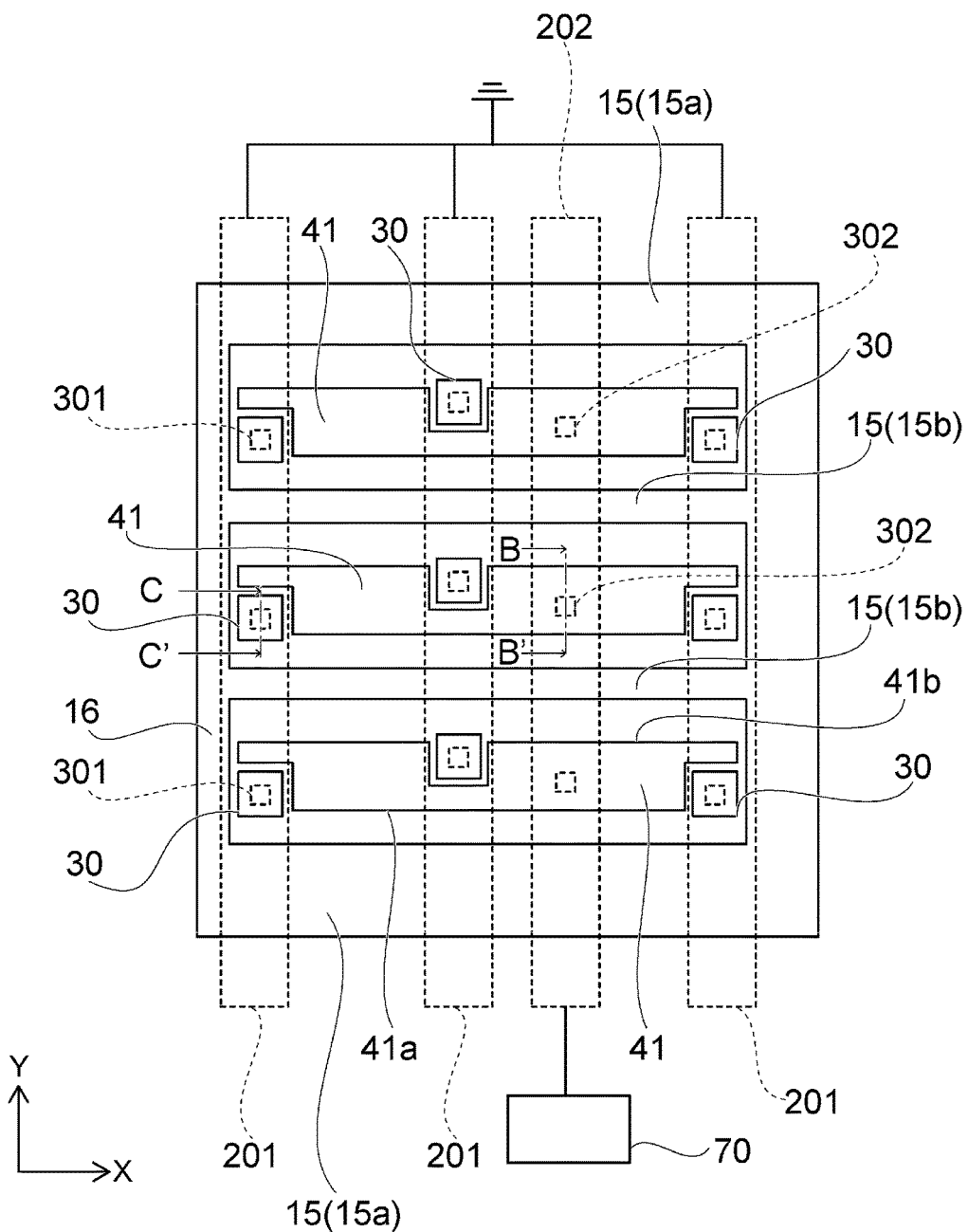
FIG. 9 is an enlarged schematic plan view of a portion illustrated in FIG. 8.

FIG. 9 is an enlarged schematic plan view of a portion illustrated in FIG. 8.

In FIG. 9, a pair of stoppers 30 is respectively arranged at the both ends in the X-direction of each fixed electrode portion 41. Each of the pair of stoppers 30 has an end portion 30a, which faces the movable electrode portion 15 at the side of the first facing surface 41a of the fixed electrode portion 41. The end portion 30a of each of the pair of stoppers 30 protrudes toward the movable electrode portion 15 and is located closer to the movable electrode portion 15 than the first facing surface 41a of the fixed electrode portion 41.

The stopper 30 is also arranged at the side of the second facing surface 41b of the fixed electrode portion 41. The stopper 30 arranged at the side of the second facing surface 41b is located between the stoppers 30 arranged at the both ends of the fixed electrode portion 41 and faces the movable electrode portion 15 at the side of the second facing surface 41b.

Between the stopper 30 and the fixed electrode portion 41 a gap is formed, so that the stopper 30 and the fixed electrode portion 41 are not in contact with each other.

Figure 10A:
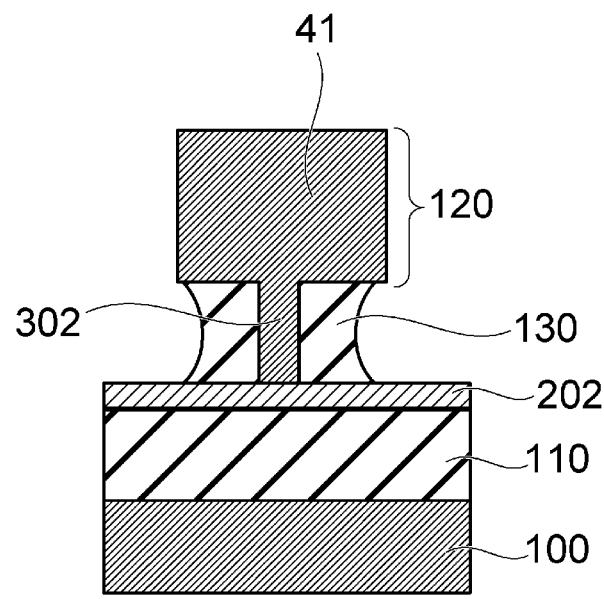
FIG. 10A is a cross-sectional view taken along line B-B' in FIG. 9.
Figure 10B:
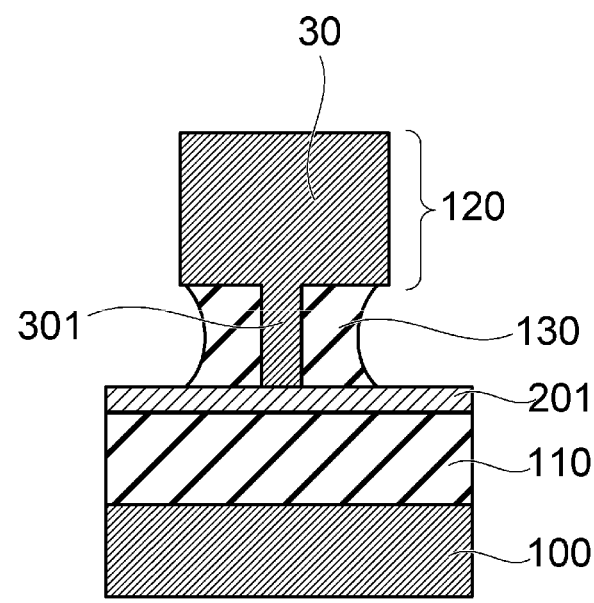
FIG. 10B is a cross-sectional view taken along line C-C' in FIG. 9.

FIG. 10A is a cross-sectional view taken along line B-B' in FIG. 9, and FIG. 10B is a cross-sectional view taken along line C-C' in FIG. 9.

As mentioned above with reference to FIGS. 6A to 6C, the fixed electrode portion 41 and the stopper 30 are formed by patterning the film 120 formed on the substrate 100. Accordingly, the fixed electrode portion 41 and the stopper 30 are provided in the same layer on the substrate 100.

In the MEMS portion having a layout illustrated in FIGS. 8 and 9, as illustrated in FIGS. 10A and 10B, the insulating film 110 is provided on the substrate 100, and wirings 201 and 202 are provided on the insulating film 110. An insulating film 130 is provided on the wirings 201 and 202, and the fixed electrode portion 41 and the stopper 30 obtained by patterning the film 120 are provided on the insulating film 130.

After the film 120 is patterned with trenches formed in the film 120 on the insulating film 130 according to the RIE method, etching is applied to the insulating film 130, which is a silicon oxide film, for example, with the use of hydrofluoric acid vapor, and portions of the insulating film 130 under the movable body 11 are removed.

The fixed electrode portion 41 is connected to the wiring 202 by way of a via 302, as illustrated in FIG. 10A. Portions of the insulating film 130 around the via 302 under the fixed electrode portion 41 remain un-removed.

The stopper 30 is connected to the wiring 201 by way of a via 301, as illustrated in FIG. 10B. Portions of the insulating film 130 around the via 301 under the stopper 30 remain un-removed.

The wiring 201 and the wiring 202 are indicated by broken lines in FIG. 9. The wiring 202 is connected to the voltage applying circuit 70, which apples the hold voltage. The wiring 201 is connected to ground.

The fixed electrode portion 41 is connected to the voltage applying circuit 70 by way of the via 302 and the wiring 202. This configuration enables attaining a reduction in space of the location area of the hold electrode 40 as compared with a configuration in which the fixed electrode portion 41 is connected to the voltage applying circuit 70 by way of a pad and a bonding wire.

The stopper 30 is connected to ground by way of the via 301 and the wiring 201. Therefore, since charge accumulation on the stopper 30 is prevented, a variation in potential of the movable electrode portion 15 being in contact with the stopper 30 and stiction can be prevented. The term. "stiction" refers to a phenomenon of operation failure in which the stopper 30 and the movable electrode portion 15 adhere together by electrostatic force caused by charging and the stopper 30 and the movable electrode portion 15 become inseparable from each other even when applying of the hold voltage is stopped.

In the layout illustrated in FIG. 1, the drive electrode 20 and the electrode portions 14 of the movable body 11 located in proximity to the drive electrode 20 can be arranged between the main mass portion 12 and the electrode 17 of the movable body 11.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit of the embodiments. The accompanying claims and their equivalents are intended to cover such forms or modifications as would fall within the scope and spirit of the embodiments.

What is claimed is:

1. An angular velocity acquisition device comprising:
a movable body that vibrates in a first direction and in a second direction that is based on Coriolis force and includes a movable electrode portion extending in the second direction;
a hold electrode that extends in the second direction and includes a fixed electrode portion opposite to the movable electrode portion across a gap; and
a stopper formed on a substrate that is provided between the fixed electrode portion and the movable electrode portion and includes an end portion closer to the movable electrode portion than a surface of the fixed electrode portion facing the moveable electrode portion, wherein
the movable electrode portion and the fixed electrode portion include a plurality of movable electrode portions and a plurality of fixed electrode portions, respectively, which are alternately arranged side by side in the first direction, and the stopper includes stoppers respectively located at both sides of each of the fixed electrode portions in the first direction.

2. The angular velocity acquisition device according to claim 1, wherein the stopper includes a pair of stoppers located at both ends of the fixed electrode portion in the second direction.

3. The angular velocity acquisition device according to claim 1, wherein both ends of the movable electrode portion in the second direction are fixed to the movable body.

4. The angular velocity acquisition device according to claim 1,
wherein the fixed electrode portion and the stopper are provided in a same layer on a substrate,
wherein the fixed electrode portion and the stopper are connected to a wiring provided in a layer below the layer in which the fixed electrode portion and the stopper are provided, and
wherein the wiring includes a first wiring connected to the fixed electrode portion and a second wiring connected to the stopper and separated from the first wiring.

5. An angular velocity measuring system comprising:
a movable body that is configured to vibrate in a first direction and a second direction when subject to a rotation about an axis orthogonal to the first and second directions,
wherein the movable body includes a movable electrode portion that extends in the second direction;
a drive electrode that receives a drive voltage that forces the movable body to vibrate in the first direction during an initial setting period;
a hold electrode that receives a hold voltage that causes the movable body to be held in a fixed position during a hold period following the vibration period, wherein the hold electrode that extends in the second direction and includes a fixed electrode portion that is positioned such that a gap is present between the movable electrode portion and the fixed electrode portion;
a sense electrode that is capacitively coupled to the movable electrode portion and senses a change in the capacitive coupling during the vibration period and while the movable body is vibrating in the second direction; and
at least one stopper formed on a substrate that is positioned between the movable electrode portion and the fixed electrode portion so as to protrude into the gap and restrict motion of the movable electrode in the first direction at a predetermined position during the hold period when the movable body is being held, wherein
the movable electrode portion and the fixed electrode portion include a plurality of movable electrode portions and a plurality of fixed electrode portions, respectively, which are alternately arranged side by side in the first direction, and the at least one stopper includes stoppers respectively located at both sides of each of the fixed electrode portions in the first direction.

6. The angular velocity measuring system according to claim 5, wherein the stopper protrusion into the gap prevents a short circuit between the fixed electrode portion and the movable electrode portion when the movable body is being held.

7. The angular velocity measuring system according to claim 6, wherein the gap has a size of approximately 0.3 to 0.5 micrometers.

8. The angular velocity measuring system according to claim 5, wherein the gap between the movable electrode portion and the fixed electrode portion has a size that reduces power consumption while the movable body is being held.

9. The angular velocity measuring system according to claim 5, wherein the stopper is approximately square and is separated from an end of the fixed electrode portion by a gap that prevents contact between the stopper and the end of the fixed electrode portion.

10. The angular velocity measuring system according to claim 5, wherein the fixed electrode portion has a plurality of stoppers embedded in the fixed electrode portion and separated by gaps from the fixed electrode portion.

11. The angular velocity measuring system according to claim 5,
wherein the movable body is disposed over the substrate; and
wherein the stopper is connected to ground by a via that connects metal of the stopper to a wiring layer disposed over the substrate.

12. The angular velocity measuring system according to claim 11, wherein a variation in potential of the movable electrode portion is prevented when the movable electrode portion is in contact with the stopper.

13. The angular velocity measuring system according to claim 11, wherein the grounded stopper prevents the movable electrode portion and the stopper from adhering together by electrostatic force.

14. The angular velocity measuring system according to claim 5, further comprising
- a detection unit coupled to the sense electrode, the detection unit detecting a change in the capacitive coupling between the sense electrode and the movable electrode portion; and
- an angular velocity calculation unit that is coupled to the detection unit to provide an indication of the angular velocity when the movable body is vibrating in the second direction.

* * * * *